United States Patent [19]

Ohno et al.

[11] Patent Number: 5,781,734
[45] Date of Patent: Jul. 14, 1998

[54] SYSTEM FOR PROVIDING AUDIO AND VIDEO SERVICES ON DEMAND

[75] Inventors: Yugo Ohno; Masataka Inoue, both of Kanagawa, Japan

[73] Assignee: NEC Corporation, Tokyo, Japan

[21] Appl. No.: 534,747

[22] Filed: Sep. 27, 1995

[30] Foreign Application Priority Data

Sep. 28, 1994 [JP] Japan .................................. 6-232742

[51] Int. Cl.$^6$ .................................................. H04N 9/79
[52] U.S. Cl. ..................... 395/200.47; 395/200.61; 395/200.32; 348/6; 348/7; 348/8; 348/12
[58] Field of Search ................. 395/200.01, 200.09, 395/200.47, 200.61, 200.32, 200.34, 200.33; 364/514 R, 514 A, 410; 463/1, 29, 37, 40, 42; 348/6, 7, 8, 10, 12; 345/2

[56] References Cited

U.S. PATENT DOCUMENTS 5,581,270  12/1996  Smith et al. ...................... 345/2
5,612,730   3/1997  Lewis .............................. 348/8

*Primary Examiner*—Thomas Peeso
*Attorney, Agent, or Firm*—Laff, Whitesel, Conte & Saret, Ltd.

[57] ABSTRACT

A system comprise a management section, a plurality of terminal sections and a coaxial cable. The management section is provided with a predetermined number of video game units and video recorders. The management section further comprises a memory for storing a plurality of video game programs. Each of the video game units executes a video game program to generate a first audio and video signal varying in response to a control signal received from a terminal section. Each of the video recorders storing a plurality of video movies generates a second audio and video signal associated with a video movie. A user of a terminal section selects a desired service from the video games and the video movies. When a video game is selected, the video game program is downloaded into the available game unit provided in the management section. The game unit runs the game program in response to the control signal received from the terminal section where the user is operating a keypad. The video images and sound varying in response to the control signal is transmitted from the management section to the terminal section through the coaxial cable.

20 Claims, 5 Drawing Sheets

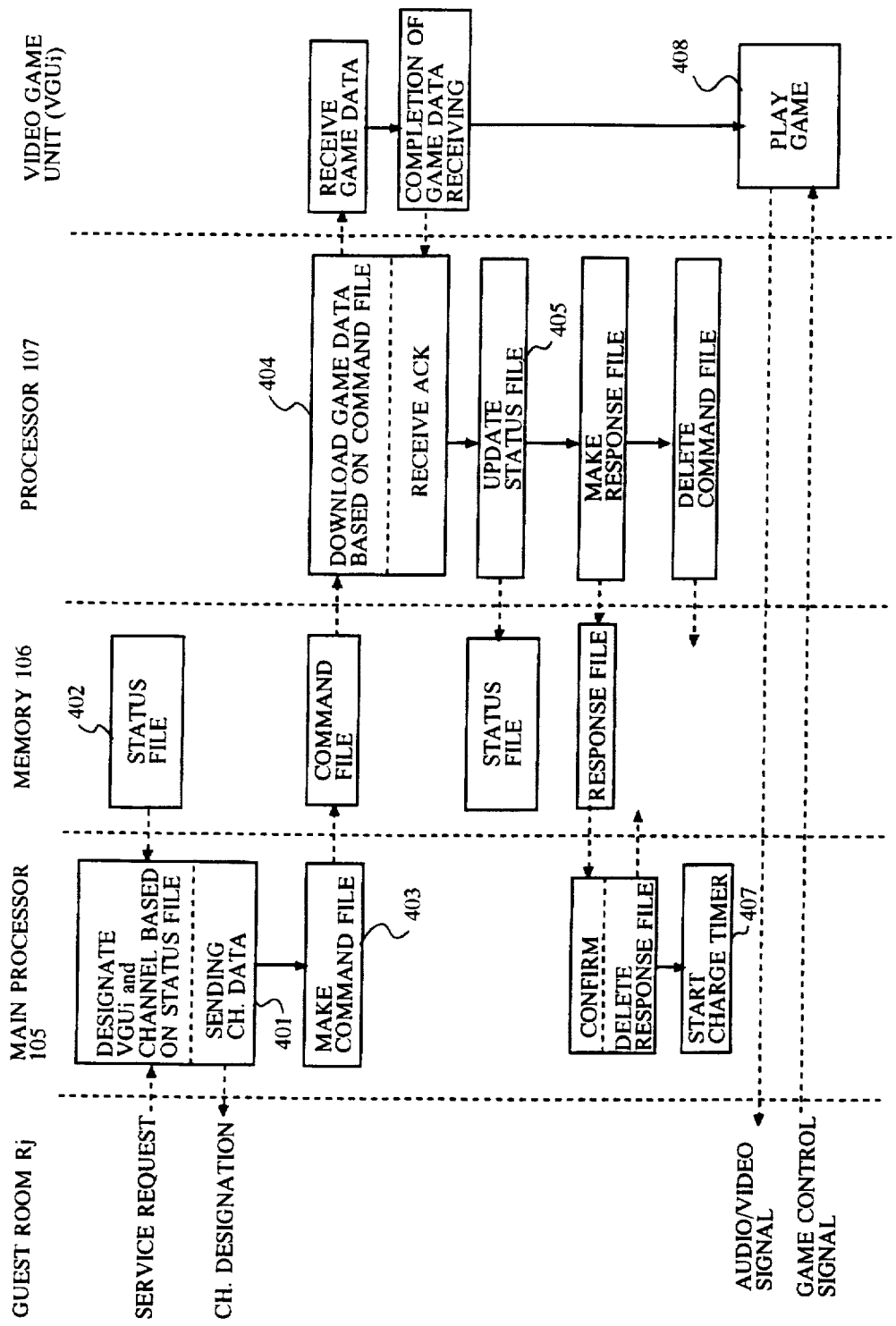

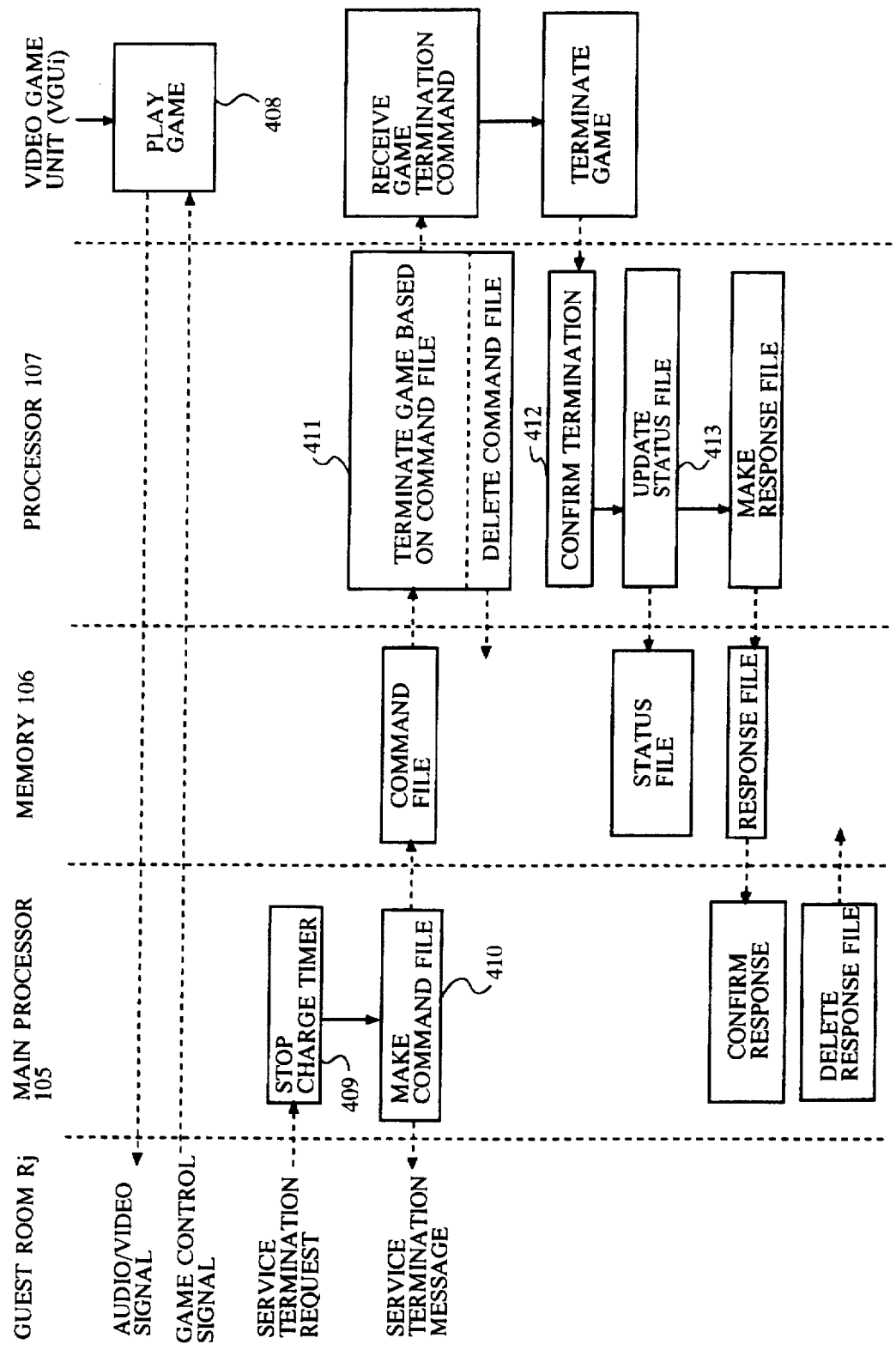

SYSTEM FOR PROVIDING AUDIO AND VIDEO SERVICES ON DEMAND

BACKGROUND OF THE INVENTION

1. Field of the Invention

The present invention relates to a system of providing audio and video services, and in particular to a system for providing audio and video services to any of a plurality of locations, for instance, guest rooms in a hotel.

2. Description of the Related Art

Nowadays almost all hotels are provided with a VTR system comprising a controller and a plurality of TV terminals each installed in a guest room. When a guest requests, for example, a video movie by operating the TV terminal, the audio and video signals of the video movie are transmitted from the controller to the TV terminal through a coaxial cable.

Moreover, with the advent of a video game, substantial needs for providing a video game service to each guest room have been increasing. In order to serve such needs, each guest room is provided with a video game unit in addition to the TV terminal. When a guest requests a video game, the requested game program is transmitted to the video game unit of the guest room on which the requested game program runs according to a game control keypad manually operated by the user.

However, since the amount of a video game program has been increased recently, such a video game system requires a high-speed cable connecting the server with the video game units. For example, a channel of several megabits per second is needed so as to download a video game unit with a video game program of 24 Mbits for several seconds. Furthermore, since the game program consists of digital data, a high-level transmission technology including an error detecting function and an error correcting function is required for reliable transfer of the program data. In addition, since a video game unit must be installed in each guest room independently of the VTR system, the cost of the whole system increases in proportion to the number of the guest rooms.

SUMMARY OF THE INVENTION

It is an object of the present invention to provide a system which is capable of providing audio and video services without a high-level and high-speed digital transfer technology.

It is another object of the present invention to provide a system which is capable of providing audio and video services to many locations on demand with a simple and low-cost structure.

According to an aspect of the present invention, a system is comprised a management section, a plurality of terminal sections and a transmission line, said management section having first video sources (e.g. video game units) and second video sources (e.g. video recorders). More specifically, the management section is further comprised of a program memory for storing a plurality of interactive software programs. Each of the first video sources is connected to the transmission line and executes an interactive software program to generate a first audio and video signal varying in response to a control signal. Each of the second video sources storing a plurality of video pieces is connected to the transmission line, and generates a second audio and video signal associated with a video piece.

The management section further has a status memory for storing a use status of the first video sources and the second video sources. A terminal section which transmits a service request to said management section is identified by, for example, polling. An available video source is selected from the first video sources and the second video sources according to the service request by referring to the use status stored in the status memory. When the service request is directed to a single interactive software program, the single interactive software program is transferred from the program memory to the available video source for execution of the single interactive software program. When the service request is directed to the single video piece, the available video source is controlled such that it generates the second audio and video signal associated with a single video piece.

In each of the terminal sections, the service request is transmitted to the management section and a connection is established to the available video source selected in the management section through the transmission line. A monitor set reproduces audio and video from an audio and video signal received from the available video source through the connection. The terminal section is provided with a keypad controller for transmitting the control signal to the available video source selected in the management section when the service request is directed to the single interactive software program.

More specifically, each of the first video sources comprises a communication means and a first processing means. The communication means receives the control signal from the keypad control means of the terminal section, and transmits the first audio and video signal to the terminal section through the transmission line. The first processing means executes the single interactive software program to generate the first audio and video signal, and sends the first audio and video signal to the communication means. The first audio and video signal varies in response to the control signal. Each of the second video sources comprises a transmitting means and a video recorder. The transmitting means is connected to the transmission line, and transmits the second audio and video signal to the terminal section through the transmission line. The video recorder stores the video pieces, and sends the second audio and video signal to the transmitting means. The second audio and video signal is associated with the video piece selected from the video pieces according to the service request.

Furthermore, the management section makes a charge to the terminal section for an audio and video service specified by the service request.

BRIEF DESCRIPTION OF THE DRAWINGS

FIG. 4 is a flow chart showing a start operation of a video game service in the embodiment; and FIG. 5 is a flow chart showing an end operation of the video game service in the embodiment.

DETAILED DESCRIPTION OF THE PREFERRED EMBODIMENT

Figure 1:
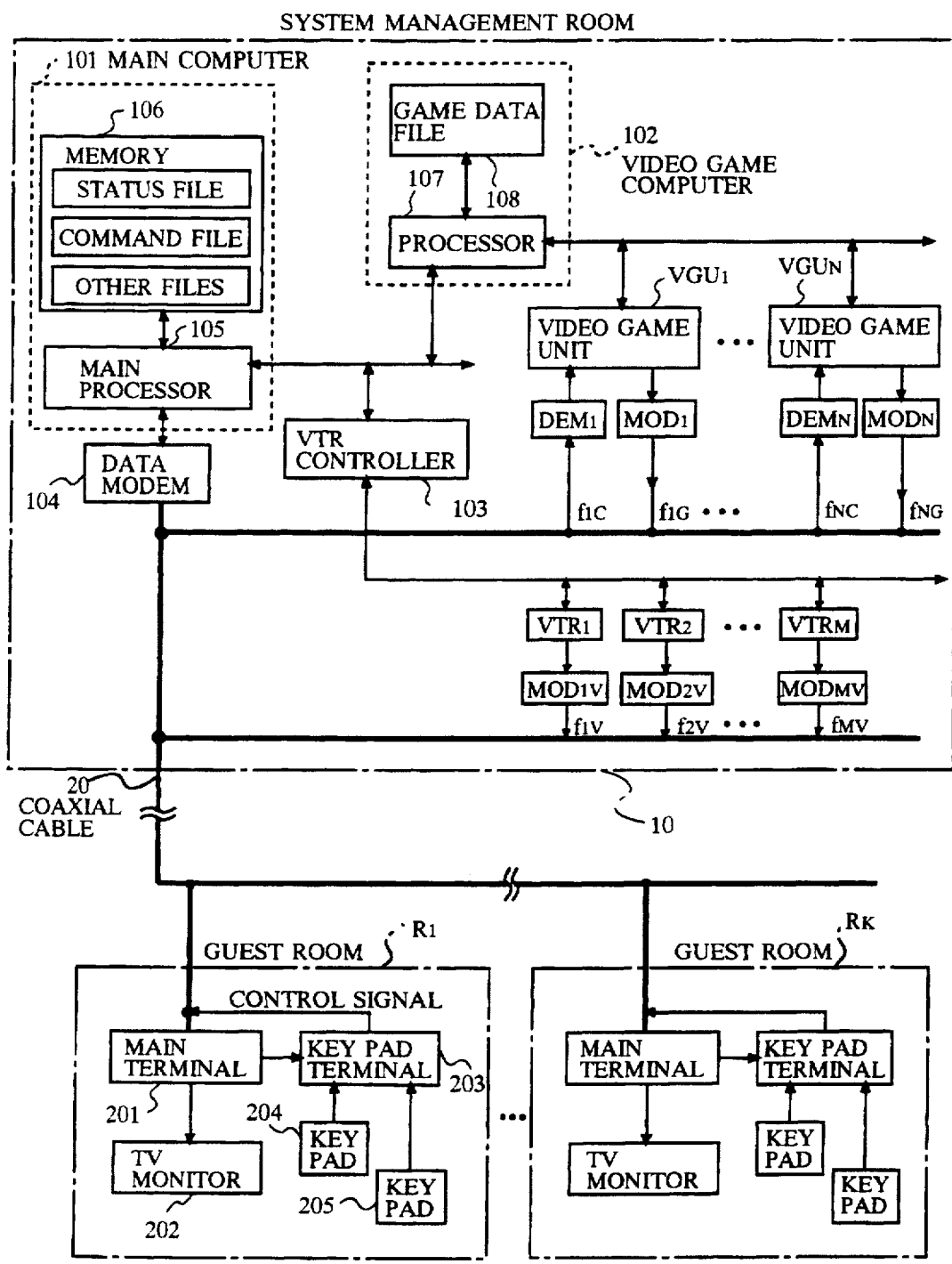
FIG. 1 is a block diagram showing an audio/video services system in a hotel according to an embodiment of the present invention.

Referring to FIG. 1, the present invention is applied to an audio/video services system of a hotel. The audio/video services system is comprised of a system management room 10, a plurality of guest rooms $R_1-R_K$, and a coaxial cable 20 which connects the system management room 10 with the guest rooms $R_1-R_x$. A predetermined number of frequency channels are set in this communications system.

The system management room 10 is provided with a main computer 101 which is connected to a video game computer 102 and a VTR controller 103 and further to the coaxial cable 20 through a data modem 104. The system management room 10 is further provided with a plurality of video sources, that is, video game units $VGU_1-VGU_N$ and video tape recorders $VTR_1-VTR_M$, where N and M each are integers smaller than the number of the guest rooms. The respective video game units $VGU_1VGU_N$ are connected to the coaxial cable 20 through demodulators $DEM_1-DEM_N$ and modulators $MOD_1-MOD_N$, respectively. The respective frequency channels $f_{1C}-f_{NC}$ are predetermined in the demodulators $DEM_1-DEM_N$ and the respective frequency channels $f_{1G}-f_{NG}$ in the modulators $MOD_1-MOD_N$. In this embodiment, each video game unit $VGU_i$ is capable of receiving a control signal of frequency $f_{iC}$ from a guest room through the demodulator $DEM_i$ and transmitting an audio and video signal of frequency $f_{iG}$ to the guest room through the modulator $MOD_i$. Further, as an example, a modulation scheme of FSK (Frequency Shift Keying) is employed in this embodiment. The video game units $VGU_1-VGU_N$ are operated under control of the video game computer 102.

The respective video tape recorders $VTR_1-VTR_M$ are also connected to the coaxial cable 20 through modulators $MOD_{1V}-MOD_{MV}$, respectively. The respective frequency channels $f_{1V}-f_{MV}$ are predetermined in the modulators $MOD_{1V}-MOD_{MV}$. In this embodiment, each video tape recorder VTRi is capable of transmitting an audio and video signal of frequency $f_{iV}$ to the guest room through the modulator MODiV. The video tape recorders $VTR_1-VTR_M$ are operated under control of the VTR controller 103.

The main computer 101 is comprised of a main processor 105, a memory 106 and other necessary circuits including a charge timer (not shown). The memory 106 stores a STATUS file, a COMMAND file and other necessary files, the STATUS file indicating the operation status of the video sources $VGU_1-VGU_N$ and $VTR_1-VTR_M$. The main processor 105 performs the system management including polling, allocation of the video sources and the charge for service, as described later.

The video game computer 102 is comprised of a processor 107 and a game data file 108. The game data file 108 stores a plurality of game software programs. The processor 107 reads out a designated one of the game software programs from the game data file 108 and transfers it to a designated video game unit in accordance with the COMMAND file of the memory 106. Receiving the game software program from the video game computer 102, the video game unit runs it and generates video images and sound varying in response to a game control signal received from the guest room through the predetermined control channel (one of $f_{1C}-f_{NC}$) of the coaxial cable 20. The audio and video signal generated by the video game unit is transmitted to the guest room through a designated video channel (one of $f_{1G}-f_{NG}$) of the coaxial cable 20.

The VTR controller 103 operates the video tape recorders $VTR_1-VTR_M$ under control of the main computer 101. More specifically, referring to the COMMAND file of the memory 106, the VTR controller 103 starts a designated video tape recorder VTR running a designated video piece such as a movie. The audio and video signal generated by the video tape recorder is transmitted to the guest room which requests the video movie through a designated video channel (one of $f_{1V}-f_{MV}$) of the coaxial cable 20.

In this embodiment, the polling sequence is employed to determine whether there is a guest who wants any audio/video service. More specifically, the main processor 105 of the main computer 101 polls each guest room in succession through each predetermined control channel ($f_{1S}-f_{NS}$) of the coaxial cable 20 to determine whether that guest room wants to access the audio/video services system. When that guest room requests a certain service, the main processor 105 performs the allocation of the video sources and the designation of an available video channel (one of $f_{1G}-f_{NG}$, $f_{1V}-f_{MV}$) as well as, if a video game is requested, the corresponding control channel (one of $f_{1C}-f_{NC}$), as explained later.

Figure 2:
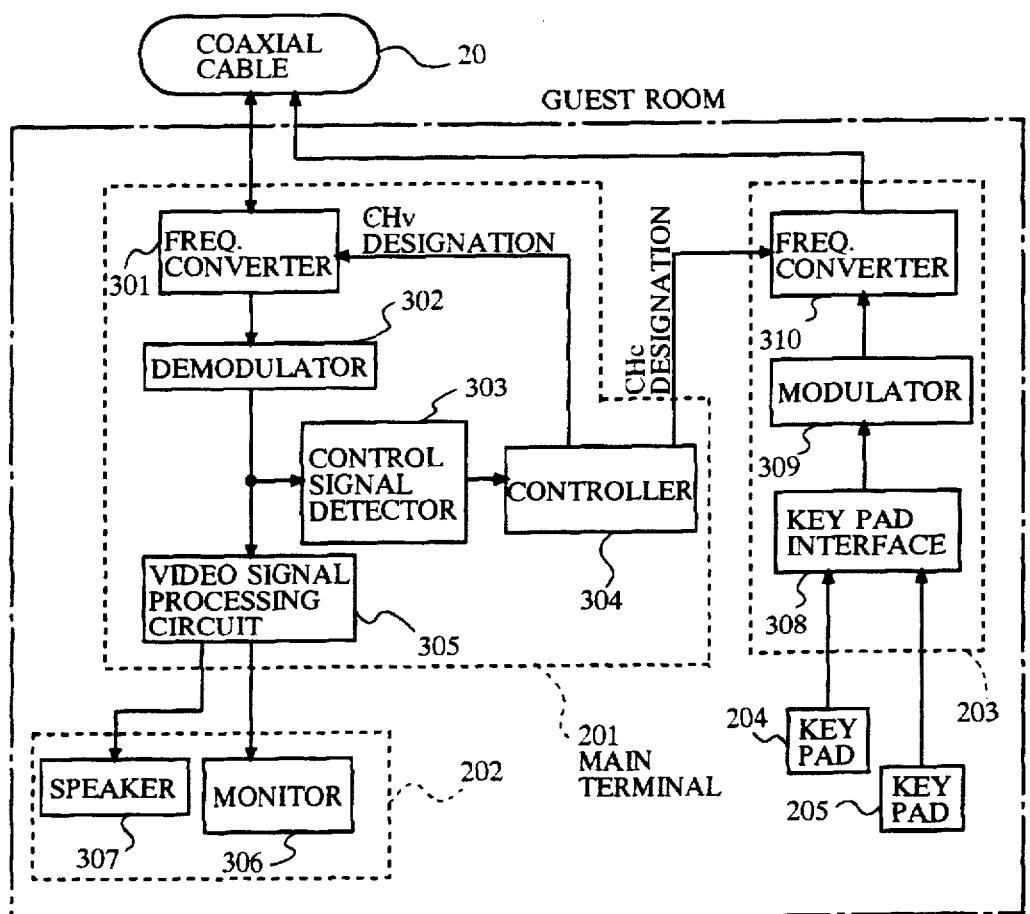
FIG. 2 is a detailed block diagram showing a terminal system provided in each guest room according to the embodiment.

As illustrated in FIG. 2, each guest room is provided with a main terminal 201, a TV monitor 202, a keypad terminal 203, and keypads 204 and 205. A frequency converter 301 of the main terminal 201 is connected to the coaxial cable 20 and is capable of changing in frequency channel according to a channel designation signal CHv. The frequency converter 301 receives a signal wave of a designated channel from the coaxial cable 20 and converts the received wave from the designated frequency to a predetermined frequency. The demodulator 302 demodulates the received wave of the predetermined frequency into a received signal which is output to a control signal detector 303 and a video signal processor 305. The control signal detector 303 detects a control signal such as a channel signal from the received signal and outputs it to the controller 304. Receiving the control signal from the control signal detector 303, the controller 304 determines a channel designated by the main processor 105 of the main computer 101 and outputs the channel designation signal CHv to the frequency converter 301. After the designated channel is established, the audio and video signal demodulated by the demodulator 302 is output to the video signal processor 305. The video signal processor 305 separates the video signal and the audio signal which are reproduced by a monitor 306 and a speaker 307, respectively. In addition, the main terminal 201 may be provided with a service keypad for requesting a desired audio/video service.

A keypad interface 308 of the keypad terminal 203 is connected with the keypad 204 and 205. A parallel signal received from each keypad is converted to a serial signal by the keypad interface 308. After the serial signal is modulated by a modulator 309, the modulated wave is transmitted to the coaxial cable 20 through a frequency converter 310. The frequency converter 310 is capable of changing in frequency channel according to a channel designation signal CHc which is received from the controller 304. In this embodiment, when a desired key of the keypad 204 and 205 is operated, a control signal corresponding to the operated key is generated and output to the keypad interface 308. Therefore, the control signal indicating a desired operation is transmitted to the main processor 105 of the main computer 101 through the designated control channel of the coaxial cable 20.

No video game unit for running a video game software program is provided in any guest room but in the management room. Each guest room is provided with only operation keypad and a monitor terminal set for reproducing sound and video images. Since there is no need to transfer the video game software program from the system management room to a guest room, this system can employ the coaxial cable 20 of a transmission rate higher than that of the existing TV transmission cable by only several tens Kbits/sec for transmission of control signals. Further, no memory for storing software data such as a video game software program is required in any guest room.

Figure 3:
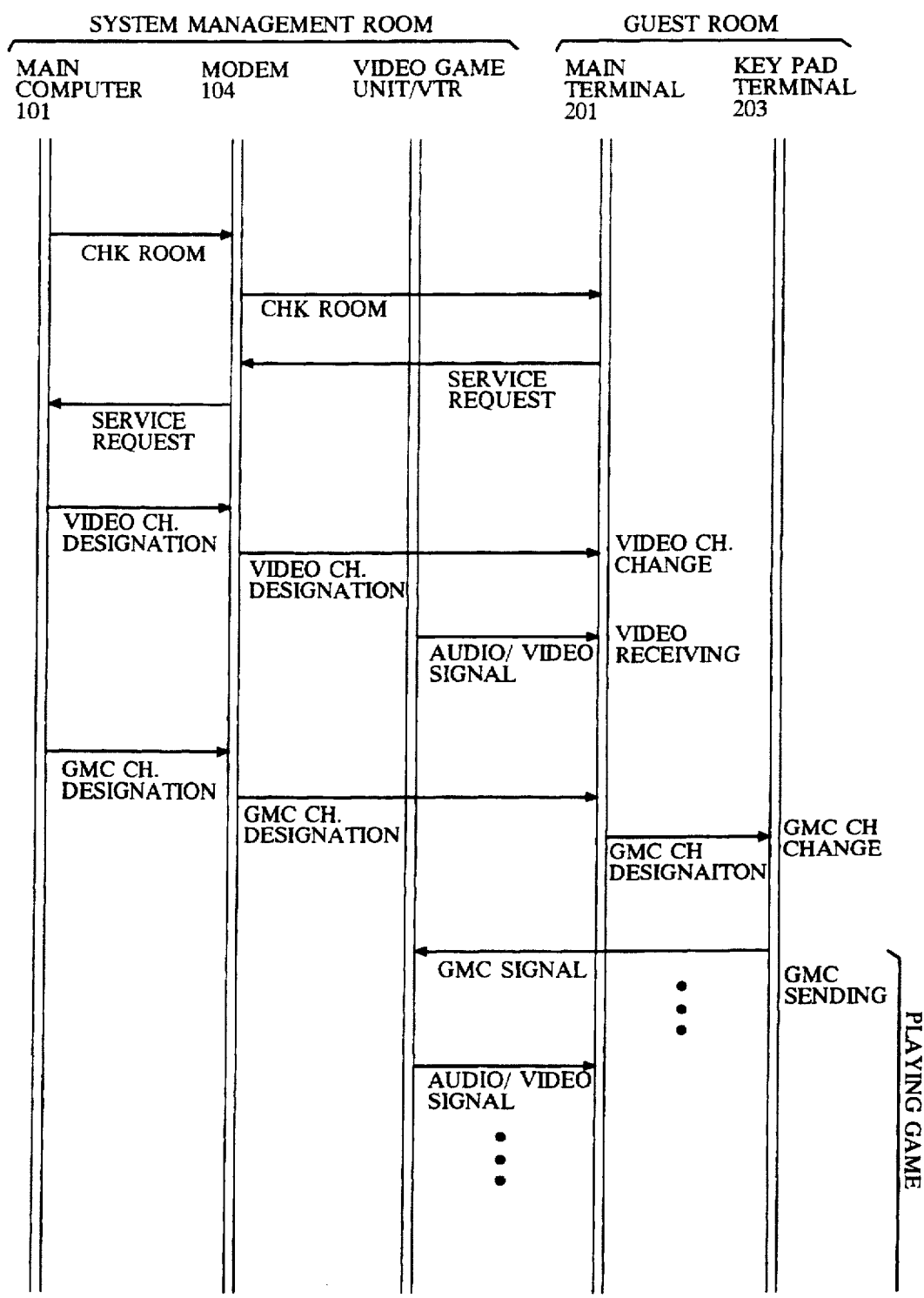
FIG. 3 is a sequence chart showing an operation of the embodiment.

FIG. 3 shows a system sequence of the embodiment. The main computer 101 performs the polling sequence by checking each guest room in succession through the data MODEM 104 at all times. When receiving a service request from the main terminal 201 of a guest room Ri, the main processor 105 of the main computer 101 transmits a channel signal designating an available video channel to the main terminal 201 of the guest room Ri. The available video channel is determined by the main processor 105 referring to the STATUS file stored in the memory 106. According to the channel signal received from the main computer 101, the main terminal 201 changes frequency channels to the designated video channel. After that, the main computer 101 controls the video game computer 102 such that an available video source (a video game unit VGU or a video tape recorder VTR) transmits an audio/video signal of the requested service to the main terminal 201 of the guest room Ri.

If the requested service is a video game, the main computer 101 designates a game control channel together with the video channel. After the game control channel and the video channel have been designated, the video game unit VGU transmits audio/video signals to the main terminal 201 of the guest room Ri. The video game unit VGU changes the audio/video signal in response to game control (GMC) signals received from the keypad terminal 203 of the guest room Ri.

Referring to FIG. 4, a game starting operation will be described in detail hereinafter. When receiving a game service request from a guest room Rj, the main processor 105 searches the STATUS file (402) stored in the memory 106 for an available video game unit. If no guest uses a video game unit $VGU_i$, the main processor 105 designates the video game unit $VGU_i$, the video channel of the frequency $f_{iG}$ and the control channel of the frequency $f_{iC}$ and transmits the channel data to the main terminal 201 of the guest room Rj (401). Subsequently, the main processor 105 creates a COMMAND file (403) for game execution.

The processor 107 of the video game computer 102 downloads the requested game data from the game data file 108 to the designated video game unit VGUi according to the COMMAND file (404). Upon completion of the game data downloading, the processor 107 updates the STATUS file such that the video game unit VGUi is occupied (405). After the main processor 105 confirms through a RESPONSE file created by the processor 107 that the STATUS file was updated, the charge timer starts counting (407) and the video game unit VGUi begins to execute the requested game software program which transmits audio/video signals to the guest room Rj in response to game control signals received from that guest room Rj (408).

Referring to FIG. 5, a game terminating operation will be described in detail hereinafter. When receiving a game termination request from the guest room Rj, the main processor 105 stops the charge timer (409) and makes a COMMAND file for game termination (410). According to the COMMAND file for game termination, a service termination message is transmitted to the guest room Rj where the message is displayed on the TV monitor 202 and the processor 107 sends a game termination command to the video game unit VGUi (411). In response to the game termination command received from the processor 107, the video game unit VGUi stops running the game software program.

Confirming the termination of the game (412), the processor 107 updates the STATUS file such that the video game unit VGUi becomes available (413). The processor 105 confirms through a RESPONSE file created by the processor 107 that the STATUS file was updated, and then deletes the RESPONSE file of the memory 106. Thus, the game service is terminated.

According to the present invention, there is no need to provide the management room with the same number of video game units as the guest rooms. Based on the access factor of the audio/video services system, the number of video game units or video tape recorders may be determined to be smaller than that of the guest rooms.

Although a video tape recorder VTR is employed in the above-mentioned embodiment, it is to be noted that another type of video source such as a video cassette recorder and a video disk recorder can be used in this embodiment.

As described above, since a plurality of video game units for running video game software programs are provided in the management room, the audio/video services are provided to each guest room by means of a coaxial cable having of a transmission rate higher than that of the existing TV-signal transmission cable by only several tens Kbits/sec for transmission of control signals. In other words, since there is no need to transfer a video game software program from the system management room to a guest room, this system can provide various audio/video services to each guest room by only adding a control signal transmission channel of a low bit rate (several tens Kbits/sec) to the existing TV-signal transmission channel. Furthermore, since the present system can be formed on the existing pay-TV service system, the incorporated charge system is easily available to the present system.

What is claimed is:

1. A system comprising a management section, a plurality of terminal sections and a transmission line, said transmission line connecting said management section with said terminal sections, said management section comprising:

a first memory for storing a plurality of interactive software programs;

a plurality of first video sources, each for executing an interactive software program to generate a first audio and video signal varying in response to a control signal, each of said first video source being connected to said transmission line;

a plurality of second video sources, each for storing a plurality of video pieces and generating a second audio and video signal associated with a video piece, each of said second video source being connected to said transmission line;

a second memory for storing a use status of said first video sources and said second video sources;

a first controller for identifying a terminal section which transmits a service request to said management section, and for selecting an available video source from said first video sources and said second video sources according to said service request by referring to said use status stored in said second memory;

a second controller for transferring a single interactive software program from said first memory to said available video source for execution of said single interactive software program when said service request is directed to said single interactive software program; and a third controller for controlling said available video source such that said available video source generates said second audio and video signal associated with a single video piece when said service request is directed to said single video piece; and each said terminal section comprising:

a terminal controller for transmitting said service request to said first controller of said management section, and establishing a connection to said available video source selected in said management section through said transmission line;

a reproducing section for reproducing audio and video from an audio and video signal received from said available video source through said connection; and a keypad controller for transmitting said control signal to said available video source selected in said management section when said service request is directed to said single interactive software program.

2. The system according to claim 1, wherein each of said first video sources comprises:

a communication section connected to said transmission line, for receiving said control signal from said keypad controller of said terminal section, and transmitting said first audio and video signal to said terminal section through said transmission line; and a first processor for executing said single interactive software program to generate said first audio and video signal, and sending said first audio and video signal to said communication section, and said first audio and video signal varying in response to said control signal.

3. The system according to claim 1, wherein each of said second video sources comprises:

a transmitter connected to said transmission line, for transmitting said second audio and video signal to said terminal section through said transmission line; and a video recorder for storing said video pieces, and sending said second audio and video signal to said transmitter, said second audio and video signals being associated with said video piece selected from said video pieces according to said service request.

4. The system according to claim 1, wherein said first controller performs a polling operation to identify said terminal section.

5. The system according to claim 1, wherein said transmission line is a coaxial cable.

6. The system according to claim 1, wherein said transmission line includes a plurality of channels which are multiplexed into said transmission line.

7. The system according to claim 6, wherein said channels are frequency-multiplexed into said coaxial cable.

8. The system according to claim 1, wherein each of said interactive software programs is a video game program and each of said first video sources comprises a video game processor.

9. The system according to claim 1, wherein said first controller further makes a charge to said terminal section for an audio and video service specified by said service request.

10. The system according to claim 1, wherein the number of said first video sources is smaller than that of said terminal sections and the number of said second video sources is smaller than that of said terminal sections.

11. A system comprising a management section, a plurality of terminal sections and a transmission line, said transmission line connecting said management section with said terminal sections through a plurality of channels, said management section comprising:

a memory for storing a plurality of interactive software programs;

a plurality of first video sources, each said first video source comprising;

a first communication circuit connected to said transmission line, for receiving a control signal from a terminal section through a first channel of said transmission line, and transmitting a first audio and video signal to said terminal section through a second channel of said transmission line; and a first processor for running an interactive software program to generate said first audio and video signal, and sending said first audio and video signal to said communication circuit, said interactive software program being selected according to a selection signal, and said first audio and video signal varying in response to said control signal;

a plurality of second video sources each comprising:

a transmitting circuit connected to said transmission line, for transmitting a second audio and video signal to a terminal section through a third channel of said transmission line; and a video recorder for storing a plurality of video pieces and sending said second audio and video signal to said transmitting circuit, said second audio and video signal being associated with a video piece selected from said video pieces according to said selection signal; and a system manager for identifying a service and a terminal section requesting said service thorough a control channel of said transmission line, and selecting an available video source from said first video sources and said second video sources to send said selection signal to said available video source selection, and transmitting a channel designation signal to said terminal section;

each of said terminal sections comprising:

a second communication circuit connected to said transmission line, for transmitting said control signal to said management section through a first designated channel and receiving an audio and video signal from said management section through a second designated channel of said transmission line;

a channel changer for changing channels according to said channel designation signal received from said management section through said control channel of said transmission line;

a reproducing section for reproducing audio and video from said audio and video signal received from said second communication circuit; and a keypad controller for sending said control signal to said communication circuit in accordance to a manual operation of a user.

12. The system according to claim 11, wherein said system manager performs a polling operation to identify said terminal section.

13. The system according to claim 11, wherein said transmission line is a coaxial cable.

14. The system according to claim 11, where said channels are frequency-multiplexed into said transmission line.

15. The system according to claim 13, where said channels are frequency-multiplexed into said coaxial cable.

16. The system according to claim 11, wherein each of said video software programs is a video game program and each of said first video sources comprises a video game processor.

17. The system according to claim 11, wherein each of said second video sources comprises a video recorder.

18. The system according to claim 11, wherein said system manager further makes a charge to said terminal section for said service.

19. The system according to claim 11, wherein the number of said first video sources is smaller than that of said terminal sections and the number of said second video sources is smaller than that of said terminal sections.

20. A method of providing audio and video services in a system comprising a management section, a plurality of terminal sections and a transmission line, said transmission line connecting said management section with said terminal sections, said management section comprising:

a first memory for storing a plurality of interactive software programs;

a plurality of first video sources each for executing an interactive software program to generate a first audio and video signal varying in response to a control signal, each said first video source being connected to said transmission line;

a plurality of second video sources each for storing a plurality of video pieces and generating a second audio and video signal associated with a video piece, each said second video source being connected to said transmission line; and a second memory for storing a use status of said first video sources and said second video sources, said method comprising the steps of:

at said management section, a) identifying a terminal section which transmits a service request to said management section, and selecting an available video source from said first video sources and said second video sources according to said service request by referring to said use status stored in said second memory;

b) transferring said single interactive software program from said first memory to said available video source for execution of said single interactive software program when said service request is directed to said single interactive software program; and c) controlling said available video source such that said available video source generates said second audio and video signal associated with a single video piece when said service request is directed to said single video piece, and at each said terminal section, d) transmitting said service request to said management section, and establishing a connection to said available video source selected in said management section through said transmission line;

e) reproducing audio and video from an audio and video signal received from said available video source through said connection; and f) transmitting said control signal to said available video source selected in said management section when said service request is directed to said single interactive software program.

\* \* \* \* \*